United States Patent
Halldorsson

(10) Patent No.: US 6,268,941 B1
(45) Date of Patent: Jul. 31, 2001

(54) HOLOGRAPHIC DISPLAY SCREEN WITH INTEGRATED SPECKLE SUPPRESSION

(75) Inventor: Thorsteinn Halldorsson, Munich (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/367,071

(22) PCT Filed: Feb. 3, 1998

(86) PCT No.: PCT/DE98/00302

§ 371 Date: Aug. 9, 1999

§ 102(e) Date: Aug. 9, 1999

(87) PCT Pub. No.: WO98/35246

PCT Pub. Date: Aug. 13, 1998

(30) Foreign Application Priority Data

Feb. 7, 1997 (DE) ............................................. 197 04 741

(51) Int. Cl.$^7$ ....................................................... G03H 1/00
(52) U.S. Cl. .................................. 359/1; 359/10; 359/11
(58) Field of Search ................................ 359/1, 10, 11, 359/13, 19

(56) References Cited

U.S. PATENT DOCUMENTS

| 3,588,217 | 6/1971 | Mathisen | 350/3.5 |
| 6,018,413 | * 1/2000 | Oka | 359/326 |

FOREIGN PATENT DOCUMENTS

| 20 29 218 | 1/1971 | (DE) . |
| 20 03 024 | 7/1971 | (DE) . |
| 0 292 209 | 11/1988 | (EP) . |
| WO 89/06001 | 6/1989 | (WO) . |

OTHER PUBLICATIONS

G.D. Ogden et al., Reduction of Holographic Image Granularity, IBM Technical Disclosure Bulletin/vol. 12 No. 12, pp. 2297–2298, May 1970.*

J.P. Huignard et al., Speckle–free imaging in four–wave mixing experiments with Bi12SiO20 crystals, Optics Letters/vol. 5, No. 10, p. 437, Oct. 1980.*

P.C. Mehta et al., Frequency–modulated zone plate for coherent noise reduction, Applied Optics/vol. 18 No. 14, pp. 2394–2397, Jul. 1979.*

"Reduction of speckle in holographic reflected–light microscopy" by H. Golbach, *Optik*, 1973, pp. 45–49.

"Reduction of Holographic Image Granularity", *IBM Technical Disclosure Bulletin*, May 1970, pp. 2297–2298.

"Speckle–free imaging in four–wave mixing experiments with $Bi_{12}SiO_{20}$ crystals" by J.P. Huignard et al., *Optics Letters*, Oct. 1980, pp. 436–437.

"Frequency–modulated zone plate for coherent noise reduction" by P.C. Mehta et al., *Applied Optics*, Jul. 15, 1979, pp. 2394–2397.

"Handbook of Optical Holograph" by H.J. Caulfield, pp. 370–371.

"Physics Letters", vol. 24A, No. 2, Jan. 16, 1967, pp. 126–127.

(List continued on next page.)

*Primary Examiner*—Cassandra Spyrou
*Assistant Examiner*—Craig Curtis
(74) *Attorney, Agent, or Firm*—Crowell & Moring, L.L.P.

(57) ABSTRACT

A method for suppressing image speckles in a holographic screen is provided in which the screen is illuminated in the hologram in a plurality of individual steps, changing the recording parameters at each step. As a result, a holographic screen is obtained that produces a speckle-free image from a hologram recorded with lasers and then illuminated by a laser. Depending on the application, the object screen can be recorded as a reflection or transmission hologram.

7 Claims, 2 Drawing Sheets

OTHER PUBLICATIONS

Kiemle et al., l"Einführung in die Technik der Holographie", Akademische Verlagsgesellschaft, pp. 105–107 (1969).

George et al., "Speckle Reduction Using Multiple Tones of Illumination", *Applied Optics*, vol. 12, No. 6, Jun. 1973, pp. 1202–1212.

\* cited by examiner

HOLOGRAPHIC DISPLAY SCREEN WITH INTEGRATED SPECKLE SUPPRESSION

BACKGROUND AND SUMMARY OF THE INVENTION

The invention relates to the manufacture and use of a holographic screen, designed for recording such that image speckles appear to only a slight extent when it is illuminated with narrow-band laser light.

When lasers are used to illuminate or display an image on a projection surface, as a result of the roughness of the surface and the associated differences in travel time of the waves departing from various parts of the surface, interferences occur in the space in front of the surface. In the eye of the observer, the interferences lead to a pronounced additional intensity modulation of the brightness distribution of the screen, which covers the image like a fine granular pattern. This applies both to screens for front projection, in other words for viewing the image in the light back-scattered from the screen, as well as in rear projection, in other words when viewing the image as the transmission of an image projected on the back of the screen. The size of the image speckles and the degree of intensity modulation depend on the fineness of the surface roughness or the density of scatter centers in a volume-scattering screen and the viewing distance and viewing angle relative to the screen. Small speckles develop in coarsely structured surfaces, and large speckles develop in finely structured surfaces. In the case of reflecting surfaces with surface roughnesses far below the wavelength of the light, the speckles are so large that they are no longer resolved as such by the eye.

The image noise caused by the speckles, which reflects the statistically distributed surface roughnesses, reduces the perceptible and geometric image resolution of the eye up to a factor of 10. Apart from the serious image deterioration caused by the speckles, in color projections involving superposition of statistical intensity distributions of the basic colors red, green, and blue independent of one another, color distortions in the form of color scintillations, rainbow effects, colored fringes, etc. appear The laser speckles, caused by the narrow line width of the laser emission, are a basic problem in image reproduction using lasers. The fact that this problem has not been successfully solved either technically or economically since the introduction of laser image projectors in the early 1970s, is one of the main reasons for the limited spread of this technology for illumination purposes and for displaying images on surfaces.

Basically, lasers are especially suitable for producing bright images because of their high beam density, especially for displaying large images. This advantage alone however is not sufficient for generating high-quality images in a bright environment as in workrooms or in daylight owing to the disturbing superimposition of the basic brightness of the room. It is only by creating a dark screen as a holographic image of a real screen that scatters laser light selectively from the screen but absorbs broad-band ambient light that it has become possible, especially by using laser light, to achieve high-contrast image projection in a bright environment, as described in earlier German patent applications 197 00 16 2.9 and 197 03 592.2.

The white scattering screen is illuminated in the basic colors of three laser beams, red, green, and blue, either in a single photolayer, in three layers on top of one another, or in a lateral arrangement in the three dots of a hologram.

During image reproduction, the hologram is scanned with the laser projector, depending on either the imaging method, with a modulated laser beam, pointwise, linewise, or in an expanded beam of a light valve projector, areawise. The hologram then scatters the light of the projection beam toward the observer like the real object screen, but with the difference that the hologram allows the disturbing broad-band ambient light to pass through where it can then be absorbed.

As is generally known, speckles also appear during the recording and reproduction of holograms using lasers; in other words, the speckle problem must be solved in both the holographic screen and the object screen. The methods that have proven effective in the object screen for reducing speckles however can be transferred in this case and improved by the additional properties of the hologram.

One of the possibilities for spectral reduction is the use of screens with an especially finely structured surface coating or a thicker surface coating in which very dense scatter centers, as in ceramic or Teflon plates, are embedded. In this case, especially large speckles are produced which are not resolved as well by the eye and thus are not perceived as disturbing to the same degree.

A second method is the use of relatively broad-band laser light sources for projection (reproduction), for example lasers with a great many longitudinal or transverse modes such as semiconductor laser diodes or glass fiber lasers with several dozen modes over a wavelength range of several nanometers. In this case, each narrow laser mode produces an independent speckle field, with the speckle fields of different modes being differently distributed in space as a result of their unequal wavelengths. Since the waves of the adjacent modes diverge very rapidly in their phases, the waves do not interfere with one another. The resultant speckle field is an uncorrelated summation of the intensities of the individual speckle fields with a reduction of the speckle modulation by a factor √N with N as the number of modes.

This advantage is also known from the reproduction of holograms. Transmission holograms recorded with lasers, for example, can be reproduced free of speckles using spectrally filtered mercury light lamps; reflection volume holograms can be reproduced using halogen lamps. This is based on the fact that the reproducing light consists of a large number of closely spaced spectral lines (continuum) over several nanometers whose speckle images average out as above.

A third possibility for reducing speckle modulation in the eye consists of causing the speckle field to move. As a result of the inertia of the eye, it averages out over the time-variable intensity modulation of the speckle field. This movement of the speckle field can be produced by moving the screen, by the scanning movement of the projection beam over the screen, or by an internal movement of partial beams within the projection beam. A fourth possibility is the combination of two or of all three screen methods listed above.

The goal of the invention is to provide a holographic screen that produces a "speckle-free" image from a hologram recorded with lasers and illuminated by a laser. Depending on the application, the object screen can be recorded as a reflection or transmission hologram.

The invention is based on two known properties of holograms, namely that basically several images of an object are stored in the same hologram as superimposed refraction grating structures and can be reproduced as separate images. The second property consists in the fact that reproduction of the image with a modified wavelength is possible with an image size change relative to the two wavelengths without a loss of quality.

The goal of the invention is to utilize these two properties of the hologram to suppress further the speckle noise of an object screen subsequently in the hologram.

The first property is utilized in order to superimpose a plurality of screen images in the hologram from a suitable object screen, for example with a very fine surface roughness or a volume scatter. By shifting the screen from one recording to the next in some direction or around any axis or by pivoting the object illumination or reference beam of the hologram, the images can be superimposed in such fashion that their fine structures add up together in an uncorrelated fashion. To accomplish this, it is sufficient to change the location of the screen on the order of fractions of the average structural size that lie in the range from several μm to 10 μm. In addition, several screens can be stacked on top of one another to various depths as virtual volume scatters. The fineness of such a pattern could be up to $\lambda/10$ for example.

If an image of a screen with its scattering properties in backward or forward scattering is recorded with a fixed wavelength and again with a second wavelength displaced relative to the first, two lattice structures result in the hologram with different lattice constants. If an illuminating beam with only one wavelength is used for recording, two superimposed images appear of different sizes relative to the wavelengths.

Since a recording of a scattering surface with statistically irregular surface structures or volume scatter centers is involved here, the superimposition produces the same effect as increasing the number of scatter centers.

By repeating this recording technique with N adjacent wavelengths over a wavelength range of several nanometers, in addition to the structuring described above, an additional fine structuring of the scattering characteristics of the screen can be produced.

During reproduction using a laser beam of only one wavelength, when using the improved finely structured screen according to the invention, larger spectral elements are produced by both methods which, combined with a movement of the speckle field, average out much better in the eye than the object screen used.

If a holographic screen of this type is illuminated with a laser beam with M modes of different wavelengths, N speckle fields of the finely structured screen are added together in terms of their intensity. Since they are not capable of interfering with one another, this produces an additional reduction of the speckles by a factor $\sqrt{N}$.

Of course, the combination of both methods and a common manufacture, for example by illuminating the hologram with a plurality of laser modes $N(\lambda(b))$ can be performed in each of the set location or angle steps $N(0)$. During reproduction, the advantageous illumination of the hologram by a laser with a plurality of modes $N(\lambda(w))$ that do not have to be exactly the same as the recording wavelengths can be employed as well.

The production of a holographic projection screen according to the invention as a reflection hologram or as a transmission hologram is described above as an example. It can be accomplished in a number of different ways and in various steps that are known and understood by the individual skilled in the art. The invention will now be described below in greater detail with reference to embodiments shown partially schematically in the figures.

DETAILED DESCRIPTION OF THE DRAWINGS

Figure 1:
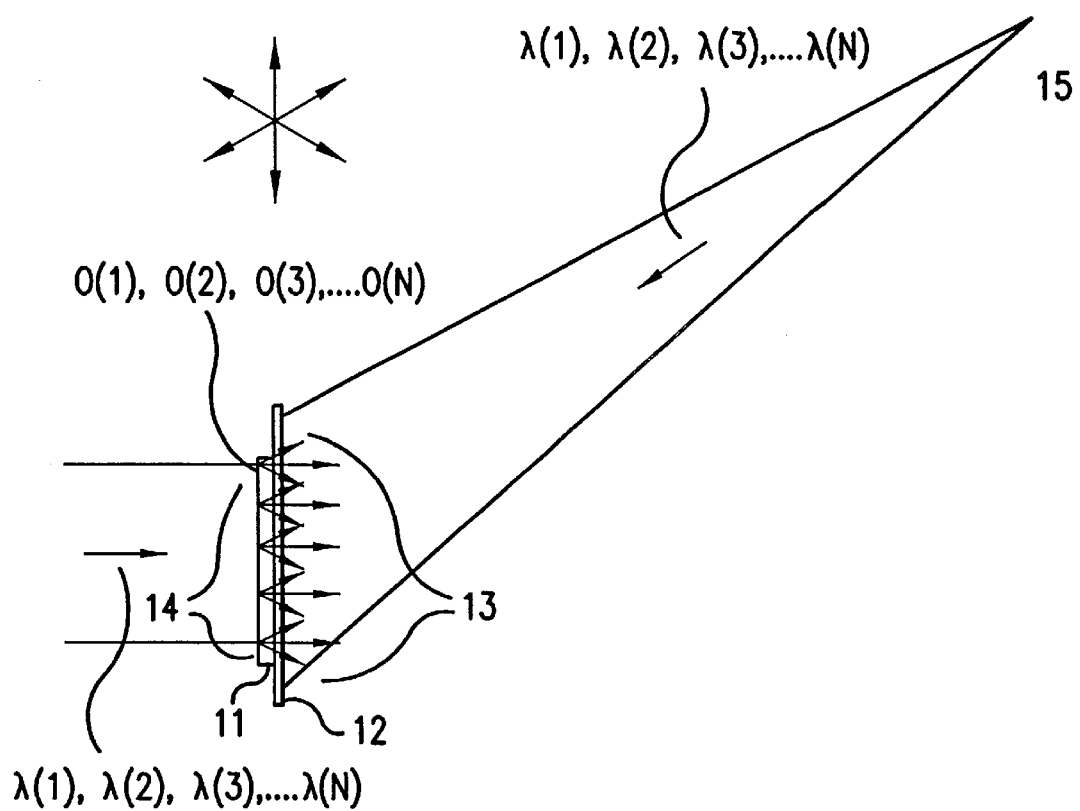
FIG. 1 shows the direct recording of a reflection hologram of a projection screen using the known method of Yu. N. Denisyuk.

FIG. 1 shows the recording of a reflection hologram of a screen in one step using the method of Denisyuk. The image screen, for example a highly back-scattering scatter disk 11, is placed only a very short distance (almost directly) on the holographic recording material 12. The object light 13 is produced by the backscattering of the illuminating beam 14 in the hologram plate, and the source itself forms the reference beam 15. The movements of the screen in steps O(1), O(2), O(3) . . . O(N) and changes in the wavelengths of the illumination in steps $\lambda(1),\lambda(2),\lambda(3)$ . . . X(N) are schematically indicated by arrows.

Figure 2:
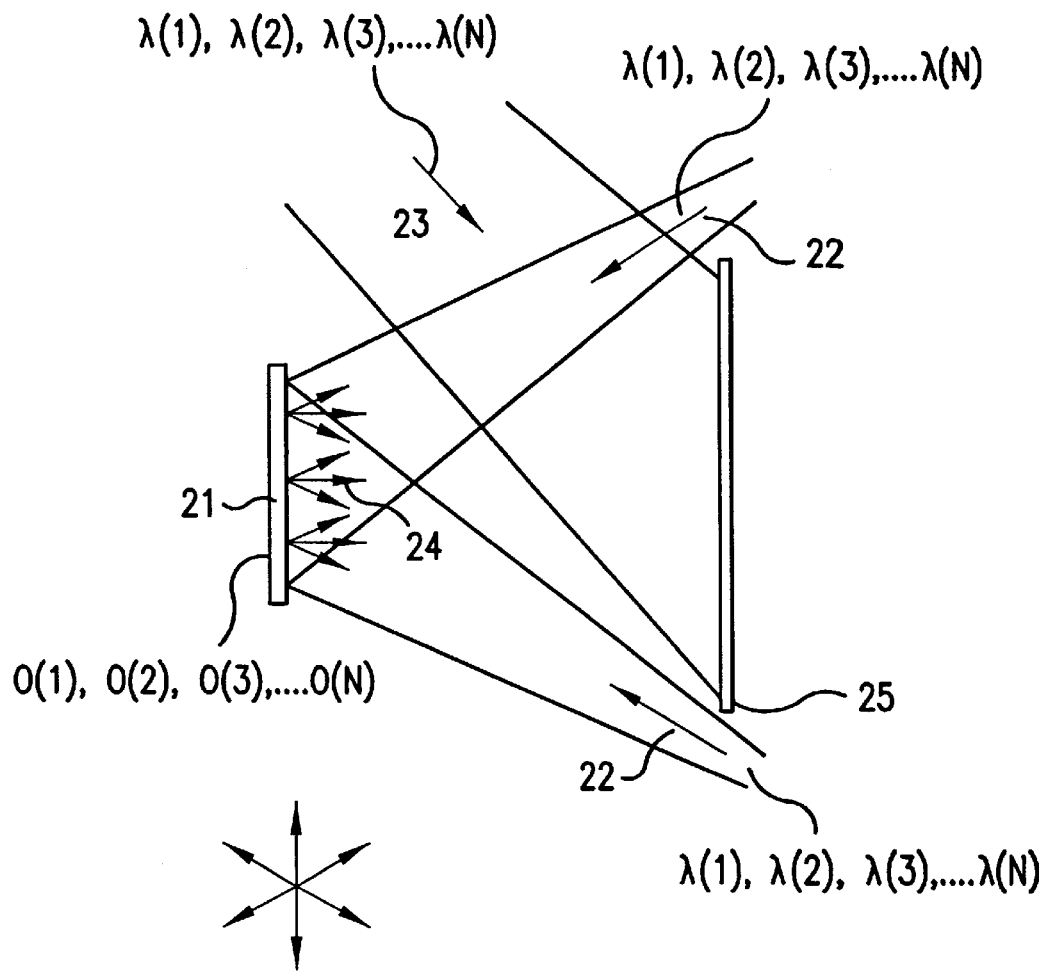
FIG. 2 shows the direct recording of a transmission hologram of a projection screen using the method of Leith and Upatniek.

FIG. 2 shows the recording of a transmission hologram of a screen in one step using the method of Leith and Upatniek. Screen 21 in this case is illuminated by two object beams 22 for example. Reference light 23 emerges from the same side onto the hologram plate 25 as the object light 24 as scattered light. The offsets of the screen in steps O(1), O(2), O(3) . . . O(N) and the changes in the wavelength of the illumination in steps $\lambda(1),\lambda(2),\lambda(3)$ . . . X(N) are indicated schematically by arrows.

It is understood that the method according to the invention can also be used when manufacturing screen holograms in several steps with the aid of master holograms.

In addition, the known copying of a plurality of copies from a single master hologram screen of the above type is possible.

Known recording materials such as silver halide material, dichromate gelatins, or photopolymers may be used as the recording material. Basically all materials are suitable that have the appropriate film resolution, dynamics, and sensitivity for storing multiple images of the type described.

For reproducing the three basic colors during projection, the recordings can be shined in the three basic colors of the screen in a single recording layer, in three successive layers, or in adjacent layers.

As the laser source for recordings of the image screen at several wavelengths sequentially, solid crystal lasers such as Nd:YAG for example are suitable that emit in the visible wavelength range with the aid of frequency conversion. During each recording, the laser is required to emit on only one wavelength by mode selection, for example with the aid of an etalon in the resonator. This stepwise change in wavelength can be accomplished for example by stepwise tuning of this etalon. With this laser, adjustments over approximately 3 nanometers are possible. An additional range over several tens of nanometers can be tuned for example with doped glass lasers or optically parametric oscillators.

For the reproduction of screen holograms, it is not necessary to use the same lasers as for recording, but also to use suitable crystal lasers, for example lasers with a high number of longitudinal modes such as fiber lasers and semiconductor lasers.

The invention is not limited to the embodiments described. It is understood that the method proposed by the invention for speckle reduction in screen holograms can also be applied to hologram recordings of other objects.

What is claimed is:

1. A method for suppressing image speckles in a holographic screen produced by recording a hologram of a screen, the method comprising the acts of:

illuminating the screen during recordation of the hologram of the screen in a plurality of individual steps in order to produce the holographic screen; and at each of said plurality of individual steps, changing one or more of the following recording parameters: location of the screen, position angle of the screen, wavelength of an illuminating beam, angle of the illuminating or reference beam.

2. The method according to claim 1, wherein the changing act further comprises the act of modifying stepwise the wavelength of the emission line in an illuminating laser between individual recordings.

3. The method according to claim 1, wherein the changing act comprises the act of shifting the location of the screen between individual recordings.

4. The method according to claim 1, wherein the changing act comprises the act of shifting the position angle of the screen between individual recordings.

5. The method according to claim 1, wherein the changing act comprises the act of changing the angle of the illuminating beam or of the reference beam.

6. The method according to claim 1, wherein both the wavelength of the illuminating beam and the location of the screen as well as the angles of the illuminating beam and reference beam are changed between recordings.

7. An apparatus for producing a holographic display screen, comprising:

a display screen;

an illumination source illuminating the display screen during the recording of the holographic display screen in a plurality of individual steps; and means for changing at least one recording parameter at each step of the illumination to record the holographic display screen, wherein the changed recording parameter is at least one of a location of the display screen, a position angle of the display screen, a wavelength of a recording laser and an angle of an illumination or reference beam;

whereby image speckles in the holographic display screen are suppressed.

* * * * *